US 6,488,845 B1

(12) United States Patent
Neufeld et al.

(10) Patent No.: US 6,488,845 B1
(45) Date of Patent: Dec. 3, 2002

(54) OIL FILTER UNIT WITH QUICK-DRAIN VALVE ACTUATOR (75) Inventors: Henry L. Neufeld, Tulsa, OK (US); L. Steven Cline, Fayetteville, NC (US)

(73) Assignee: Purolator Products NA, Inc., Fayetteville, NC (US)

(*) Notice: Subject to any disclaimer, the term of this patent is extended or adjusted under 35 U.S.C. 154(b) by 0 days.

(21) Appl. No.: 09/637,187

(22) Filed: Aug. 11, 2000

Related U.S. Application Data (60) Provisional application No. 60/148,538, filed on Aug. 12, 1999.

(51) Int. Cl.[7] .................. B01D 35/153; B01D 35/14; B01D 27/08
(52) U.S. Cl. .................. 210/232; 210/248; 210/440; 210/450; 210/DIG. 17
(58) Field of Search .................. 210/248, 232, 210/440, 450, DIG. 17

(56) References Cited

U.S. PATENT DOCUMENTS

| 4,906,365 | A | | 3/1990 | Baumann et al. ............ 210/238 |
| 4,948,503 | A | * | 8/1990 | Baumann et al. |
| 5,413,712 | A | * | 5/1995 | Gewiss et al. |
| 5,556,542 | A | | 9/1996 | Berman et al. ............. 210/232 |
| 5,589,060 | A | | 12/1996 | Gebert et al. ............. 210/130 |
| 5,770,054 | A | | 6/1998 | Ardes ..................... 210/130 |
| 5,814,215 | A | | 9/1998 | Bruss et al. .............. 210/130 |

FOREIGN PATENT DOCUMENTS

| DE | 3903675 | * | 8/1990 |
| DE | 4240656 | * | 7/1993 |
| DE | 4311598 A | | 3/1995 |
| DE | 43 31 598 A | | 3/1995 |
| DE | 29815023 U | | 11/1998 |
| DE | 298 15 023 U | | 1/1999 |
| GB | 2 162 079 A | | 1/1986 |
| GB | 2162079 A | | 1/1986 |
| WO | 97/48470 | * | 12/1997 |

OTHER PUBLICATIONS

International Search Report PCT/US00/22008, Nov. 28, 2000.

* cited by examiner

Primary Examiner—Thomas M. Lithgow
(74) Attorney, Agent, or Firm—Barnes & Thornburg (57) ABSTRACT An oil filter assembly includes a filter housing and a release valve for regulating oil drainage from a filter chamber in the filter housing. A filter module is arranged in the filter chamber to engage the release valve. A first biasing element normally moves the release valve to an opened position allowing drainage of oil from the filter chamber to urge the filter module to cause the release valve to move against and overcome a biasing force generated by the first biasing element to the closed position when the filter module is installed in a oil-filtering position in the filter housing.

29 Claims, 5 Drawing Sheets

OIL FILTER UNIT WITH QUICK-DRAIN VALVE ACTUATOR

This application claims benefit of Prov. No. 60/148,538 filed Aug. 12, 1999.

The present invention relates to a system for filtering engine oil in an internal combustion engine. More particularly, the present invention relates to an oil filter assembly having an oil filter positioned within a filter chamber of the assembly.

BACKGROUND OF THE INVENTION

It is well known to provide a replaceable oil filter that is housed within a filter chamber attached to an internal combustion engine. Typically, a bottom portion of the housing forming the chamber is permanently coupled to, or integral with, the engine block. A top portion of the housing is typically designed to detach from the bottom portion to allow the filter to be replaced when it has met its useful service life.

One problem with replacing such an oil filter is that oil can become trapped in the bottom portion of the chamber which results in an undesirable amount of oil covering the interior and exterior of the filter upon removal. This can make replacement of the filter a messy proposition. Heretofore, others have attempted to solve this problem by providing a release valve in the lower end of the bottom portion of the housing which is actuated during removal of the top portion of the housing. Prior efforts to provide a suitable relief valve have involved the use of complex biasing systems which typically utilized multiple calibrated springs mounted within the relief valve. The use of such small, highly calibrated springs and the required assembly into a tight space in the relief valve has resulted in undesirable expense in manufacture of the filter assembly.

Moreover, such prior relief valve systems required fairly precise tolerances in the dimensions of the oil filter and filter housing. This is so because the downward pressure exerted by closure of the housing onto the filter was used to provide the force necessary to overcome the upward bias of the spring mounted in the quick release valve. If adequate tolerances were not maintained and the filter was too small relative to the housing, the closure of the housing could provide insufficient force to seal the release valve. Conversely, if the filter were too large relative to the housing, the housing could fail to fully close and seal. Maintenance of such tight tolerance in the closure mechanism of the housing and filter dimensions can prove difficult for the filter manufacturer and typically leads to increased expense in the manufacture of prior filters.

Thus, there is a need for a filter assembly which has an improved quick relief system. There is also a need for a filter assembly that allows for greater dimension tolerances for replaceable filters and housings.

SUMMARY OF THE INVENTION

The present invention is directed to an oil filter assembly including a housing defining a chamber, and an oil filter positioned within the chamber. In one embodiment of the invention, a support is positioned within the chamber having at least one flexible member adapted to be coupled to the housing. The flexible support member provides a flexible mount for the filter which allows the filter manufacturer a greater variance in the dimensions of the filter and housing.

In another embodiment of the invention, an oil filter assembly is provided having a housing defining a chamber with an inlet channel opening into the chamber and an outlet channel opening into the chamber, an oil filter positioned in the chamber, a seal for the outlet channel, and a biasing element positioned between the housing and the filter and configured to bias the oil filter toward the seal. The provision of the biasing element and its position between the housing and the oil filter ensure that the filter is biased sufficiently against the seal to ensure that a reliable seal is formed. This arrangement also provides a filter assembly with greater dimensional variance in filter and housing manufacture and ensures a reliable seal of the filter within the housing.

In still another embodiment of the invention, an oil filter assembly is provided which includes a housing defining a chamber, an oil filter positioned in the chamber, a releasable channel formed in said housing in fluid communication with the chamber, a release valve positioned for releasably sealing said release channel, and a biasing element positioned between the housing and oil filter and configured to bias the oil filter within the chamber toward the closed position of the release valve.

BRIEF DESCRIPTION OF THE DRAWINGS

The detailed description particularly refers to the accompanying figures in which.

DETAILED DESCRIPTION OF THE DRAWINGS

Figures 1, 2:
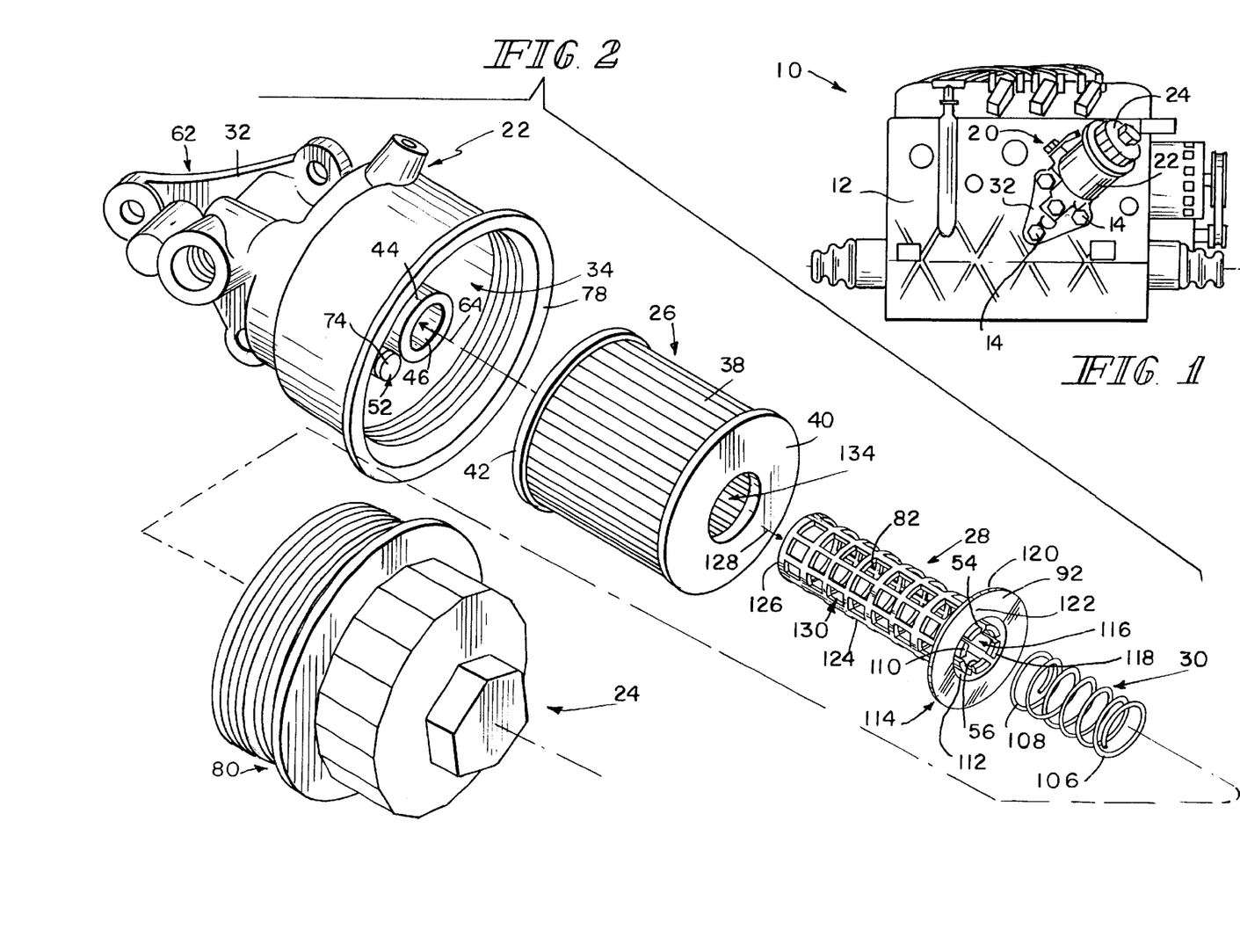
FIG. 1 is a side elevational view of an internal combustion engine with an oil filter assembly of the present invention coupled to the engine block of the engine.
FIG. 2 is an exploded view of the oil filter assembly of FIG. 1 having an assembly housing, an oil filter, a center tube, a main spring, and an assembly cover.
Figures 3, 4:
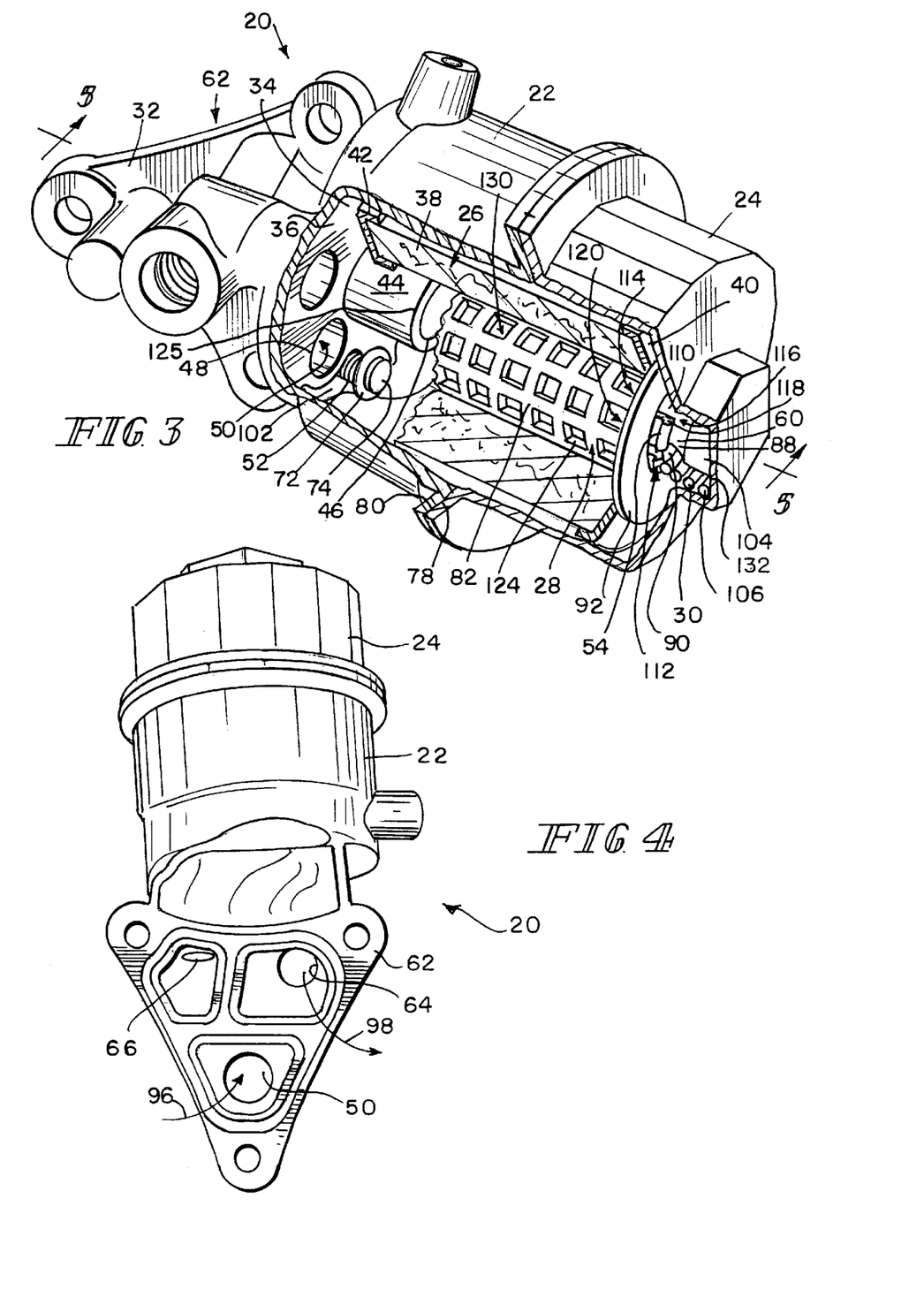
FIG. 3 is a perspective view of the oil filter assembly of FIG. 2 in its assembled form with portions cut away showing the assembly cover screwed to the assembly housing and having a filter chamber which contains the oil filter, the center tube, and the main spring and further showing an inlet port to the filter chamber, an outlet port from the filter chamber, and a release valve within the filter chamber.
FIG. 4 is an elevational view of the oil filter assembly of FIG. 3 viewing the oil filter assembly from the perspective of an engine mating face and showing an outlet channel, an inlet channel, and a release valve channel.

As shown in FIG. 1, an oil filter assembly 20 is mounted to the side of an engine block 12 of an internal combustion engine 10. Lag bolts 14 screwed through a mounting flange 32 of oil filter assembly 20 and into block 12 accomplish the coupling. FIG. 2 shows the basic components of oil filter assembly 20 including an oil filter 26, a center tube or support 28 and a main spring 30, all sized to fit within a filter chamber 34 defined by an assembly housing 22 and an assembly cover 24. As best shown in FIG. 3, with the parts of oil filter assembly 20 assembled, at one end, center tube 28 snaps onto an engagement plug 60 molded within assembly cover 24 and, at the other end, over an outlet port 46 molded within assembly housing 22.

Surrounding center tube 28 is oil filter 26. Oil filter 26 is formed to include a tube-receiving channel 134 within which a tube body 82 of center tube 28 closely fits. With the basic parts of oil filter assembly 20 assembled in this way, oil flows into filter chamber 34 through an inlet channel 50 of assembly housing 22 which opens into filter chamber 34 at an inlet port 48. After flowing through inlet channel 50, and into filter chamber 34, the oil surrounds oil filter 26 and is forced radially inward through filter medium 38 toward center tube 28 so that contaminants and other impurities are removed from the oil by filter medium 38. After the oil has been forced through the filter medium 38 and reaches center tube 28, it flows through various peripheral passageways 130 defined by windows 124 of tube body 82 and into central passageway 128 of center tube 28. Once inside central passageway 128, the oil proceeds through an outlet port 46 of assembly housing 22 and down an outlet channel 64 defined, in part, by the outlet post 44 at base 36 of assembly housing 22. The oil, having now passed through filter medium 38, is clean and ready to return to engine 10.

FIG. 4 shows an engine mating face 62 of mounting flange 32 of oil filter assembly 20 defining three channels. Oil is pumped from an oil pan 136 (shown in FIG. 5) and through inlet channel 50 to inlet port 48 (best seen in FIG. 3) in base 36 of assembly housing 22. After passing through filter medium 38, the cleaned oil passes out of filter assembly 20, through outlet channel 64. FIG. 4 also shows a third channel, a release valve channel 66, which will be discussed below.

Figures 5, 6:
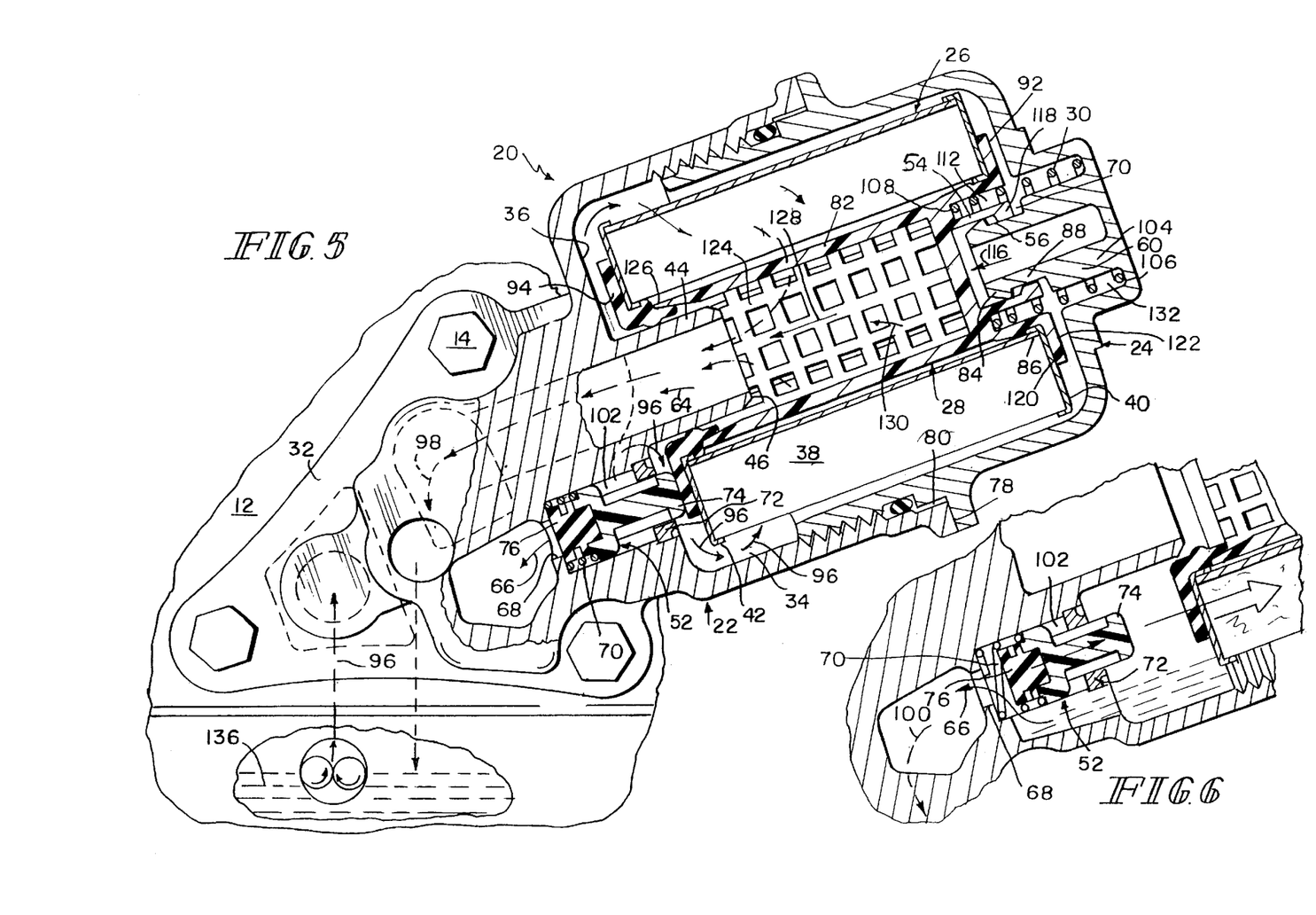
FIG. 5 is a sectional view of the oil filter assembly of FIG. 3 taken along line 5—5 of FIG. 3 illustrating the flow of oil through the oil filter assembly during engine operation, and showing the oil filter within the filter chamber which forces the release valve to its closed position.
FIG. 6 is a partial view of the oil filter assembly of FIG. 5 showing the oil filter being backed out of the filter chamber as the assembly cover is being unscrewed from the assembly housing, thereby releasing the release valve and allowing oil to flow through the release valve channel.

FIG. 5 illustrates the flow of engine oil through filter assembly 20 during normal operation of engine 10, wherein oil is pumped from oil pan 136 through inlet channel 50 upon which it enters filter chamber 34 via inlet port 46, passes through oil filter 26, and exits filter chamber 34 through outlet port 46 and down outlet channel 64.

With the entire oil filter assembly 20 assembled as shown in cross-section in FIG. 5, a filter seal 94 adjacent a second end cap 42 of oil filter 26 seals against outlet post 44 which projects from assembly housing base 36 so that oil entering filter chamber 34 through inlet port 48 must flow around the outside of oil filter 26 and through filter medium 38 and cannot bypass oil filter 26 by flowing directly into central passageway 128 of center tube 28. Additionally, with the entire oil filter assembly 20 assembled, filter seal 94 engages a head 74 of a release valve 52 positioned in a valve chamber 102 in assembly housing base 36, which in turn pushes against a valve spring 70 and blocks a valve plug 76 against a release port 68 so that oil may not flow around release valve 52, through release port 68, and through the release valve channel 66.

However, when assembly cover 24 is unscrewed from assembly housing 22, the engagement plug 60 in assembly cover 24 pulls center tube 28 and oil filter 26 out of filter chamber 34 so that oil filter 26 no longer engages head 74 of release valve 52. In doing so, a valve spring 70 surrounding valve plug 76 pushes head 74 of release valve 52 through a release valve collar 72 in assembly housing base 36. In this way, valve plug 76 is no longer blocking release port 68 and oil may freely flow from valve chamber 102, around release valve 52, through release port 68, and into release valve channel 66. When assembly cover 24 is removed from assembly housing 22 (for example, when changing the oil filter) any oil that is in filter chamber 34 will drain around release valve 52 and into release valve channel 66 which carries the oil back to the oil pan. Therefore, instead of having excess oil present in filter chamber 34 run out and onto the user removing the assembly cover, it will instead drain back into filter pan 136.

Figure 7:
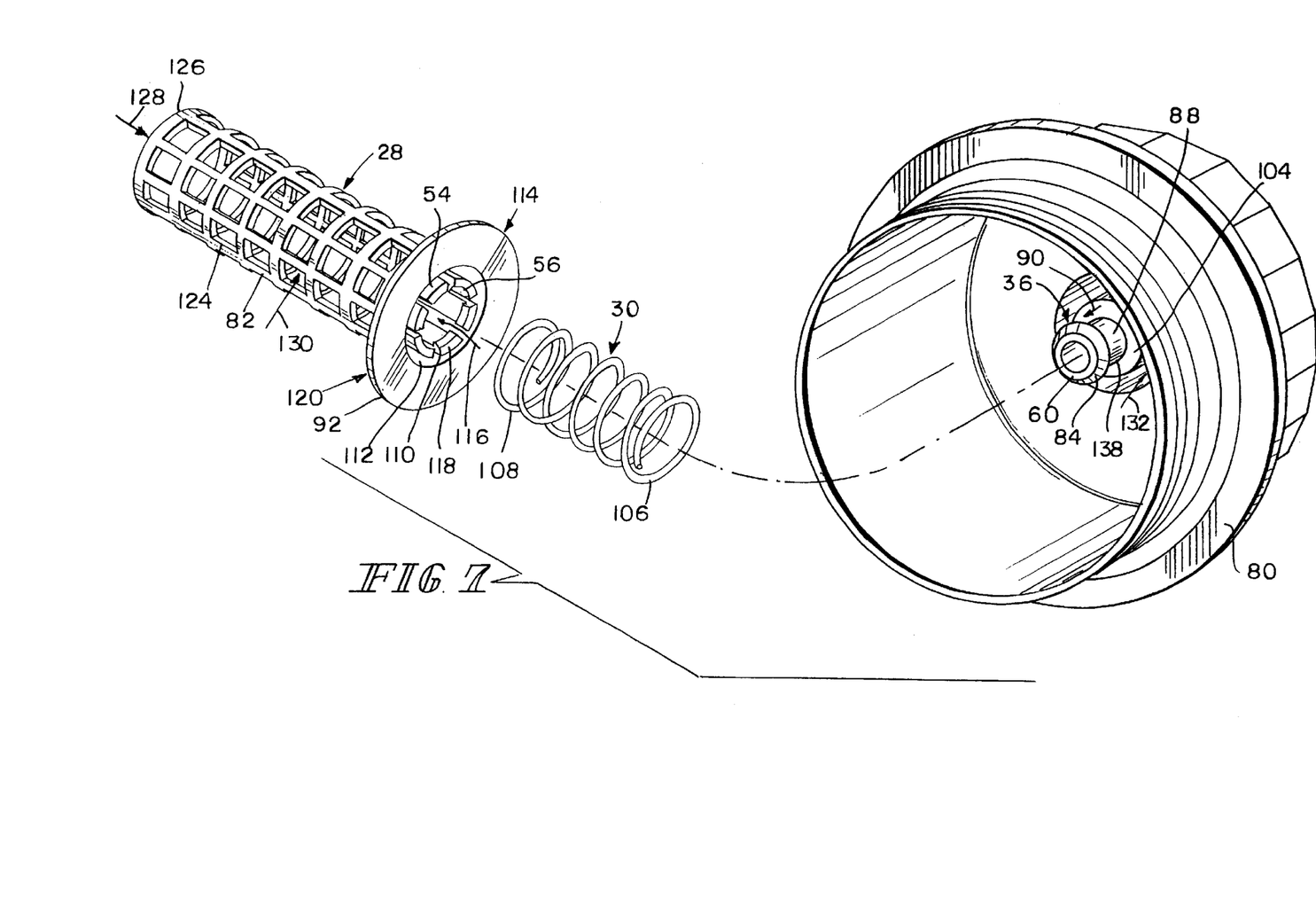
FIG. 7 is an exploded view of the assembly cover, the main spring and the center tube showing the center tube having a ring of fingers within its head.

As shown in FIG. 7, a tube head 114 of center tube 28 includes a flange 92 which rests on a first end cap 40 of oil filter 26 when center tube 28 is inserted within oil filter 26 (shown in FIG. 3). While center tube or support 28 has been shown in its preferred form as a removeable and reusable piece which is distinct from the filter, it is contemplated that the center tube or support could be fused to, or integral with, the filter. Contained within tube head 114 and surrounded by tube flange 92 is a ring 110 of several fingers 54 which are able to flex and snap around flared end 84 of an engagement plug 60 in assembly cover 24. With fingers 54 snapped around flared end 84, finger tips 118 are positioned adjacent shaft 88 of engagement plug 60 and lips 56 of the various fingers 54 cooperate with flared end surfaces 86 of engagement plug 60 to secure center tube 28 to assembly cover 24 as shown in FIG. 5. With center tube 28 coupled in this way to assembly cover 24, a second end 108 of main spring 30 is held within a perimeter channel 112 surrounding finger ring 110 and a first end 106 of main spring 30 is held within a plug channel 132 surrounding engagement plug 60, thereby "spring loading" center tube 28 in its connection to assembly cover 24. In this way, fingertips 118 may ride up and down within a fingertip channel 90 having a distance 138 (also shown in FIG. 8) so that when the oil filter assembly 20 is assembled, a bottom flange surface 120 of center tube 28 pushes down snugly against first end cap 40 of oil filter 26.

This arrangement provides sufficient force on filter seal 94 and against release valve 52 to insure release valve 52 holds valve plug 76 firmly against release port 68 regardless of the exact dimensions of the parts involved. In other words, as shown in FIG. 5, main spring 30 takes up any "slack" within oil filter assembly 20. Thus, to insure complete closure of release valve 52, the tolerances of the parts involved do not need to be as precise as if main spring 30 were not present. It should be noted that the spring constant of main spring 30 must be greater than the spring constant of valve spring 70 to guarantee closure of release valve 52. Although FIGS. 2, 3, 5–8, and 10 show the preferred biasing element, a coil spring 30, it is contemplated that other biasing elements may be used to take up the slack in the oil filter assembly, e.g., a leaf spring, gas filled resilient container, deformable resilient pad, or other resilient device.

Figure 8:
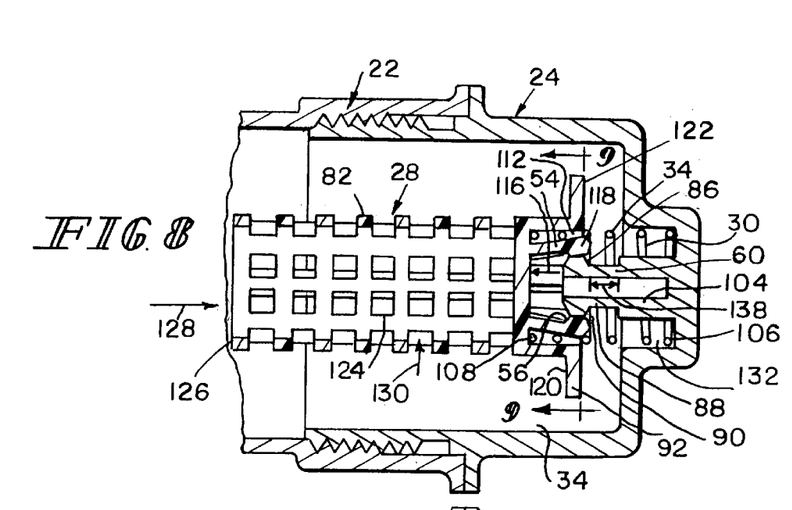
FIG. 8 is a partial sectional view, similar to FIG. 5 of the oil filter assembly of FIG. 3 showing the assembly cover being screwed onto the assembly housing, thereby deflecting the fingers of the center tube as a flared end of an engagement plug molded within the assembly cover is forced through the ring of fingers.
Figure 9:
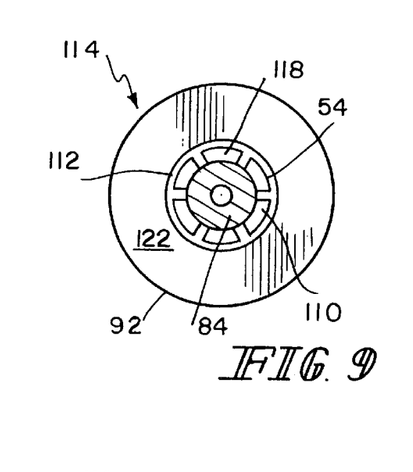
FIG. 9 is a sectional view of FIG. 8 taken along line 9—9 of FIG. 8 showing the fingers in their deflected positions as they snap over the flared end of the engagement plug.
Figure 10:
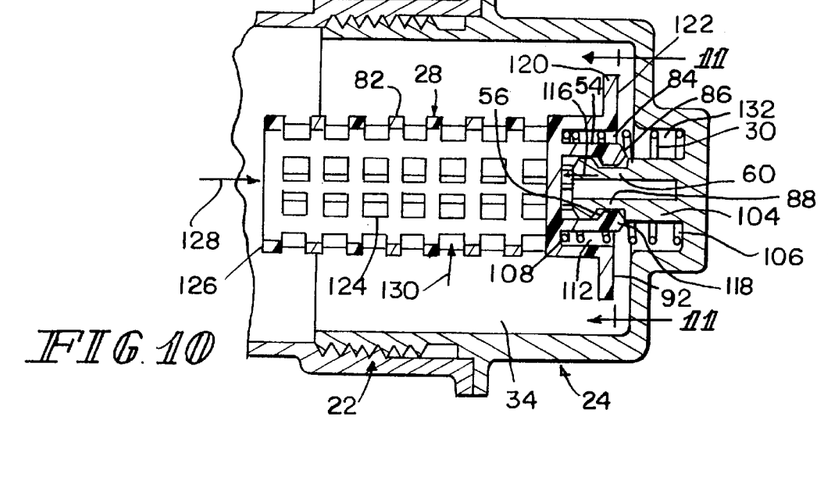
FIG. 10 is a sectional view, similar to FIG. 8, of the oil filter assembly of FIG. 3, showing the flared end of the engagement plug beyond the ring of fingers and fingertips of the fingers positioned within a fingertip channel formed adjacent the engagement plug, thereby securing the center tube to the engagement plug when the assembly cover is fully screwed into the assembly housing.
Figure 11:
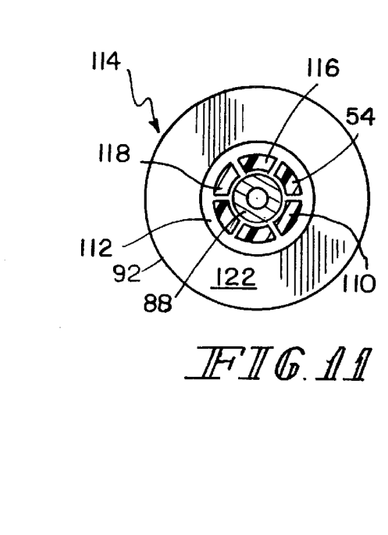
FIG. 11 is a sectional view of FIG. 10 taken along line 11—11 showing the fingertips within the fingertip channel and adjacent the shaft of the engagement plug and, thus, in their undeflected position.

As shown in FIGS. 8 through 11, fingers 54 of center tube 28 are constructed of a flexible material so that fingertips 118 may snap over and around flared end 84 of engagement plug 60 and ride up and down in fingertip channel 90 and against shaft 88 of engagement plug 60. In this way, engagement plug 60, and, therefore, assembly cover 24, may or may not be constructed of an elastic material. Since fingers or flexible members 54 are constructed of an elastic material such as plastic and can easily deform, there is no need to construct engagement plug 60, or for that matter assembly cover 24, of an elastic material. As shown in FIG. 8, as fingertips 118 of center tube 28 ride over flared end 84 of engagement plug 60, fingers 54 deform radially outward. As shown in FIGS. 10 and 11, once fingertips 118 have passed flared end 84 of engagement plug 60 they spring back radially inward to their home state as fingertips 118 are allowed to move radially inward toward shaft 88 of engagement plug 60 because shaft 88 has a smaller diameter than flared end 84. Wile the fingers 54 are shown in the Figures as the preferred flexible member to couple the support to the housing, it is contemplated that other flexible members may also be used, e.g., a clamp or resilient ring with a flexible ridge or detent for engaging the channel 90.

The applicant has provided description and figures which are intended as an illustration of certain embodiments of the invention, and are not intended to be construed as containing or implying limitation of the invention to those embodiments. It will be appreciated that although applicant has described various aspects of the invention with respect to specific embodiments, alternatives and modifications will be apparent from the present disclosure which are within the spirit and scope of the present invention as set forth in the following claims.

What is claimed:

1. An oil filter assembly comprising
   a housing defining a chamber, said housing includes a first portion adapted to couple to a first support and a second portion adapted to couple to the first portion,
   a release channel formed in said housing in fluid communication with the chamber,
   a release valve positioned for releasably sealing said release channel,
   an oil filter positioned in the chamber, said oil filter being dimensioned to actuate the release valve for sealing the release channel during coupling of the second portion of the housing to the first portion of the housing and for unsealing the channel during uncoupling of the second portion of the housing from the first portion of the housing,
   a second support positioned in the chamber, the second support having at least one flexible member adapted to slidably couple to the second portion of the housing between a first position in which the filter is located further from the release valve and a second position in which the filter is located closer to the release valve, and
   a biasing element positioned between the second portion of the housing and at least one of the oil filter and second support, said biasing element urging the oil filter toward the second position.

2. The oil filter assembly of claim 1, wherein the housing includes an inlet channel, outlet channel, and a seal, said seal being positioned adjacent to the outlet channel, and said biasing element being configured to bias at least one of the support and oil filter toward the seal.

3. The oil filter assembly of claim 1 wherein said support is integral with said oil filter.

4. The oil filter assembly of claim 1 wherein said support is removable from said oil filter assembly.

5. The oil filter assembly of claim 1 wherein said biasing element is positioned between the housing and oil filter and is configured bias said oil filter toward said seal.

6. The oil filter assembly of claim 1 wherein the release channel is in fluid communication with the chamber and an oil pan.

7. The oil filter assembly of claim 1 wherein said biasing element is a coiled spring.

8. An oil filter assembly comprising
   a housing defining a chamber, said housing includes a first portion adapted to couple to a first support and a second portion adapted to couple to the first portion,
   a release channel formed in said housing in fluid communication with the chamber,
   a release valve positioned for releasably sealing said release channel,
   an oil filter positioned in the chamber,
   a second support positioned in the chamber, the second support having a plurality of flexible fingers on a first end on the second support, said flexible fingers slidably coupling to a slot formed in the second portion of the housing between a first position in which the filter is located further from the release valve and a second position in which the filter is located closer to the release valve, and
   a biasing element positioned between the second portion of the housing and at least one of the oil filter and support, said biasing element urging the oil filter toward the second position.

9. An oil filter assembly comprising
   a filter housing formed to include a filter chamber, the filter housing including a base formed to include a release port located to drain oil from the filter chamber and a removable cover coupled to the base to form the filter chamber therebetween,
   a release valve mounted for movement relative to the base between an opened position allowing flow of oil from the filter chamber through the release port and a closed position blocking flow of oil from the filter chamber through the release port,
   a filter module positioned to lie in the filter chamber, the filter module including an exterior portion located in the filter chamber to contact oil admitted into the filter chamber through an oil inlet provided in the filter housing, the filter module being formed to include an interior portion defining a filtered-oil region located in the filter module to receive oil that has passed through the filter module from the exterior portion to the interior portion and arranged to discharge oil from the filter chamber through an oil outlet provided in the filter housing,
   a first biasing element arranged to urge the release valve away from the release port formed in the filter housing, and
   a second biasing element positioned to lie in a space formed between the filter module and the cover and arranged to urge the filter module in the filter chamber toward the base to move the release valve to the closed position against a biasing force generated by the first biasing element to maintain the release valve in the closed position.

10. The filter assembly of claim 9, wherein a spring constant associated with the second biasing element is greater than a spring constant associated with the first biasing element.

11. The filter assembly of claim 9, wherein the base is formed to include an outlet post arranged to extend into the filtered-oil region located in the filter module and formed to include the oil outlet provided in the filter housing and the filter module includes a filter seal arranged to slidably engage the outlet post to establish a sealed connection between the filter module and the outlet post to block flow of oil from the filtered-oil region through the releaseport via the filter chamber and to maintain the sealed connection during movement of the filter module in the filter chamber relative to the outlet post.

12. The filter assembly of claim 11, wherein the filter seal includes a sleeve arranged to surround and mate with the outlet post and a flange arranged to extend radially outwardly from the sleeve and engage the release valve during movement of the release valve from the opened position to the closed position.

13. The filter assembly of claim 11, wherein the base is also formed to include a release valve channel having an inlet opening at one end communicating with the filter chamber and an outlet opening at an opposite end communicating with the release port, the release valve is mounted for movement in the release valve channel between the opened position and the closed position, and the first biasing element is located in the release valve chamber and arranged to remain therein during movement of the release valve between the opened position and the closed position.

14. The filter assembly of claim 13, wherein the release valve includes a body arranged to engage the first biasing element and a valve head coupled to the body and arranged to extend into the filter chamber during movement of the release valve between the opened position and the closed position.

15. The filter assembly of claim 9, wherein the base is also formed to include a release valve channel having an inlet opening at one end communicating with the filter chamber and an outlet opening at an opposite end communicating with the release port, the release valve is mounted for movement in the release valve channel between the opened position and the closed position, and the first biasing element is located in the release valve chamber and arranged to remain therein during movement of the release valve between the opened position and the closed position.

16. The filter assembly of claim 9, wherein the release valve includes a body arranged to engage the first biasing element and a valve head coupled to the body and arranged to extend into the filter chamber during movement of the release valve between the opened position and the closed position.

17. The filter assembly of claim 16, wherein the filter module includes a filter seal arranged to engage the valve head during movement of the release valve between the opened position and the closed position.

18. The filter assembly of claim 9, wherein the base includes a bottom wall formed to include the release port and an annular side wall extending from the bottom wall toward the cover, the cover includes a top wall and a side wall extending from the top wall toward the bottom wall of the base, the side wall of the base threadedly engages the side wall of the cover to provide means for separating the cover from the base only after rotational movement of the cover about a central axis relative to the base and a predetermined amount of axial movement of the cover along the central axis relative to the base so that the release valve will move away from the closed position under a force generated by the first biasing element to cause oil in the filter chamber to begin to drain from the filter chamber past the release valve through the release port following rotational and axial movement of the cover relative to the base before separation of the cover from the base.

19. The filter assembly of claim 9, wherein the removable cover includes a top wall, a side wall coupled to the top wall and to the base, and an engagement plug appended to the top wall and positioned to lie in the filter chamber to mate with the filter module, and the second biasing element is arranged to extend into an annular space located between the engagement plug and a portion of the top wall of the removable cover.

20. The filter assembly of claim 19, wherein the filter module includes a plurality of flexible fingers that are arranged to surround a distal portion of the engagement plug and mate with channels formed in the distal portion of the engagement plug.

21. The filter assembly of claim 20, wherein the filter module further includes a filter element arranged to engage the release valve and formed to include the exterior portion and the interior portion, the filter module further includes a center tube arranged to extend into the filtered-oil region, the filter element is coupled to the center tube to move therewith, and the plurality of flexible fingers are coupled to the center tube to move therewith.

22. The filter assembly of claim 9, wherein the filter module further includes a filter element arranged to engage the release valve and formed to include the exterior portion and the interior portion and the filter module further includes a center tube arranged to extend into the filtered-oil region and coupled to the removable cover.

23. The filter assembly of claim 22, wherein the base is formed to include an outlet post arranged to extend into the filtered-oil region and into an oil-conducting passageway formed in the center tube and the outlet post is formed to include the oil outlet provided in the base.

24. The filter assembly of claim 23, wherein the filter module further includes a filter seal arranged to slidably engage the outlet post to establish a sealed connection between the filter element, the center tube, and the outlet post to block flow of oil from the oil-conducting passageway formed in the center tube through the release port via the filter chamber.

25. An oil filter assembly comprising
a filter housing base adapted to be mounted on an engine, the filter housing including a bottom wall and an annular side wall appended to the bottom wall to define a filter-receiving space therebetween, the bottom wall being formed to include a release port located to drain oil from the filter-receiving space,
a release valve mounted for movement relative to the base between an opened position allowing flow of oil from the filter-receiving space and a closed position blocking flow of oil from the filter-receiving space through the release port,
a first biasing element arranged to move the release valve relative to the base normally to the opened position, and
valve actuator means for moving the release valve relative to the base against the first biasing element to the closed position normally to block flow of oil from the filter-receiving space through the release port, the valve actuator means being mounted for movement on the annular side wall of the base to cause the release valve to move under a biasing force generated by the first biasing element from the closed position toward the opened position to drain oil from the filter-receiving space through the release port in response to movement of the valve actuator means away from the bottom wall of the base wherein the valve actuator means further includes a second biasing element arranged to urge the filter module in the filter-receiving space toward the bottom wall of the base normally to move the release valve to the closed position against the biasing force generated by the first biasing element to maintain the release valve in the closed position.

26. The filter assembly of claim 25, wherein the valve actuator means includes a filter module arranged to extend into the filter-receiving space to contact the release valve, the filter module includes an exterior portion located in the filter-receiving space to contact oil admitted into the filter-receiving space through an oil inlet provided in the base, and the filter module is formed to include an interior portion defining a filtered-oil region located in the filter module to receive oil that has passed through the filter module from the exterior portion to the interior portion and arranged to discharge oil from the filter-receiving space through an oil outlet provided in the base.

27. The filter assembly of claim 26, wherein the valve actuator means further includes a cover threadedly coupled to the annular side wall.

28. The filter assembly of claim 27, wherein a spring constant associated with the second biasing element is greater than a spring constant associated with the first biasing element.

29. The filter assembly of claim 26, wherein the base is formed to include an outlet post arranged to extend into the filtered-oil region located in the filter module and formed to include the oil outlet provided in the base and the filter module includes a filter seal arranged to slidably engage the outlet post to establish a sealed connection between the filter module and the outlet post to block flow of oil from the filtered-oil region through the release port via the filter-receiving space and to maintain the sealed connection during movement of the filter module in the filter-receiving space relative to the outlet post.

\* \* \* \* \*